United States Patent
Su et al.

(10) Patent No.: US 8,219,338 B2
(45) Date of Patent: Jul. 10, 2012

(54) TESTING METHOD FOR BUS PARAMETERS

(75) Inventors: Wang-Ding Su, Taipei Hsien (TW);
Yung-Cheng Hung, Taipei Hsien (TW);
Hsien-Chuan Liang, Taipei Hsien
(TW); Po-Kai Huang, Taipei Hsien
(TW); Mi-Wen Tsai, Taipei Hsien (TW);
Chi-Ren Kuo, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 864 days.

(21) Appl. No.: 12/261,021

(22) Filed: Oct. 29, 2008

(65) Prior Publication Data
US 2010/0070223 A1 Mar. 18, 2010

(30) Foreign Application Priority Data
Sep. 16, 2008 (CN) .......................... 2008 1 0304520

(51) Int. Cl.
*G01R 13/02* (2006.01)
*G01R 13/00* (2006.01)
*G06F 11/00* (2006.01)

(52) U.S. Cl. .......................................... 702/67; 714/43

(58) Field of Classification Search .................... 702/67; 714/43
See application file for complete search history.

(56) References Cited

U.S. PATENT DOCUMENTS

| | | | | |
|---|---|---|---|---|
| 4,870,704 A * | 9/1989 | Matelan et al. | ................ | 710/120 |
| 5,204,864 A * | 4/1993 | Won | ................ | 714/43 |
| 5,440,722 A * | 8/1995 | VanderSpek et al. | ............ | 714/43 |
| 5,471,462 A * | 11/1995 | Amador | ................ | 370/252 |
| 6,516,378 B1 * | 2/2003 | Yamashita et al. | ............ | 710/306 |
| 6,707,474 B1 * | 3/2004 | Beck et al. | ................ | 715/771 |

* cited by examiner

*Primary Examiner* — Janet Suglo
(74) *Attorney, Agent, or Firm* — Altis Law Group, Inc.

(57) ABSTRACT

A testing system for bus parameters includes a wave displaying unit and a control module connected to the wave displaying unit. The control module includes a decode unit, a testing unit connected to the decode unit, and an output unit connected to the testing unit. The decode unit is connected to the wave displaying unit. The wave displaying unit is configured for receiving an electronic signal from a bus to be tested. The decode unit is configured for decoding the electronic signal to determine if the electronic signal is valid. The testing unit tests parameters of the bus. The output unit displays testing results for the parameters.

12 Claims, 2 Drawing Sheets

TESTING METHOD FOR BUS PARAMETERS

BACKGROUND

1. Field of the Disclosure

The present disclosure relates to an auto-testing system, and particularly to a system and a method for automatically testing bus parameters.

2. Description of Related Art

Oscillographs have been commonly used to test bus parameters of a printed circuit board. For most testing methods, users only can manually test various parameters of a bus through using one oscillograph at a time. Thus, the efficiency of bus parameter testing declines when there are a lot of buses to be tested. Additionally, manual operation may reduce the testing accuracy.

What is needed, therefore, is a system and a method for automatically testing parameters which can solve the above problem.

DETAILED DESCRIPTION

Figure 1:
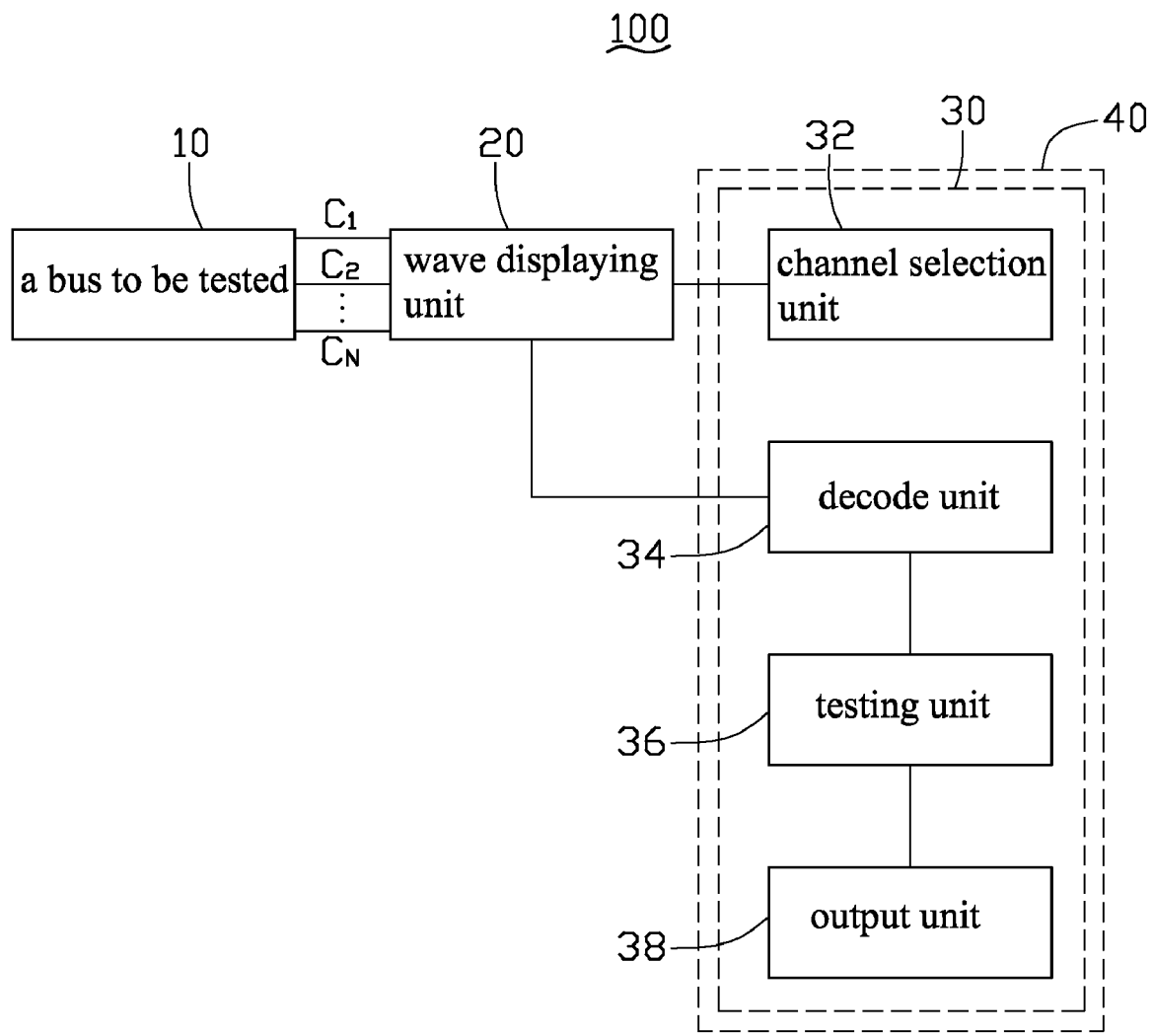
FIG. 1 is a block diagram of an exemplary system for automatically testing bus parameters.

Referring to FIG. 1, an exemplary system 100 for automatically testing bus parameters may includes a bus 10 to be tested, a wave displaying unit 20, and a control module 30. The control module 30 may include a channel selection unit 32, a decode unit 34, a testing unit 36 and an output unit 38. An input terminal of the wave displaying unit 20 is connected to the bus 10 through a plurality of electronic signal channels C1, C2, . . . , Cn. Each electronic signal channel can be set to transmit one kind of electronic signal. For example, in one embodiment, the electronic signal channel C1 is set to transmit a clock electronic signal from the bus 10 to the wave displaying unit 20. The system 100 can test the work frequency of the bus 10 through the clock electronic signal records. In one embodiment, there are many other kinds of electronic signals, such as, voltage electronic signal, current electronic signal, and so on. An output terminal of the wave displaying unit 20 is connected to the channel selection unit 32 and the decode unit 34. The decode unit 34 is connected to the output unit 38 through the testing unit 36. In one embodiment, the bus 10 can be a transmission line on a printed circuit board or a bus in a computer.

The bus 10 can generate one or more electronic signals. The wave displaying unit 20 can be an oscillograph, in one embodiment, and configured to receive the electronic signals from bus 10 through corresponding electronic signal channels. The control module 30 can be embedded in a computer 40, and operated by an operation interface in the computer 40. The channel selection unit 32 controls the wave displaying unit 20 to select electronic signal channels from C1 to Cn to receive the electronic signals from the bus 10. In one exemplary example, the computer may be a general purpose computer.

Figure 2:
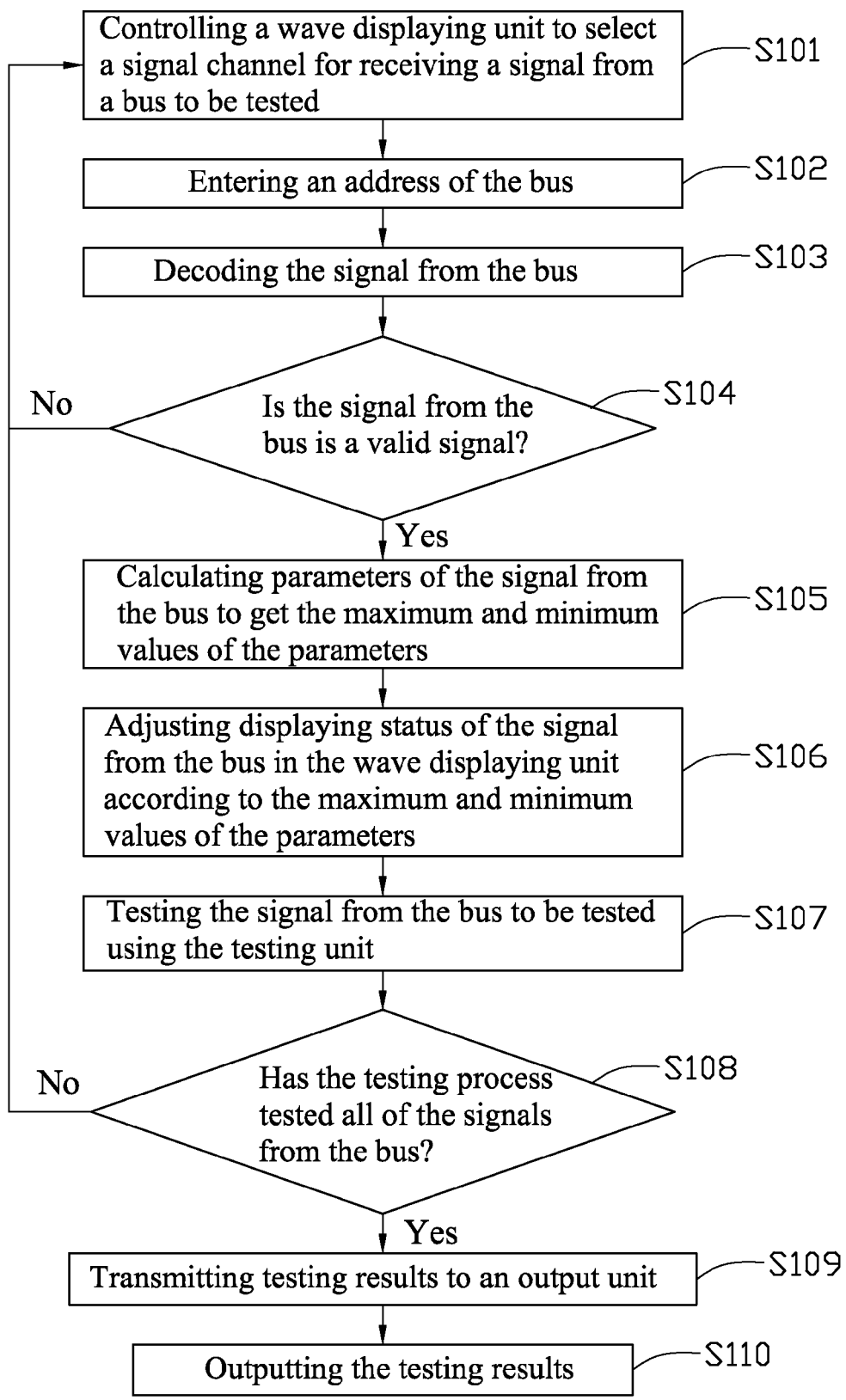
FIG. 2 is a flowchart of an exemplary method for automatically testing bus parameters.

Referring to FIG. 2, an exemplary method for automatically testing bus parameters may include following blocks. Depending on the embodiments, additional blocks may be added, others removed, and the ordering of the blocks may be changed.

In block S101, the channel selection unit 32 is operated through the operation interface in the computer 40 for controlling the wave displaying unit 20 to select a electronic signal channel for receiving a electronic signal from the bus 10. In one embodiment, there are many selection keys for different kinds of electronic signals. For example, when a user hits a key for the clock electronic signal, the channel selection unit 32 controls the wave displaying unit 20 to select the electronic signal channel C1 to receive the clock electronic signal.

In block S102, an identification of the bus 10 is inputted through the operation interface in the computer 40, and the identification of the bus 10 is stored in the decode unit 34. In one embodiment, each bus 10 has a identification for help the decode unit 34 identify signals whether come from the bus 10.

In block S103, the decode unit 34 receives the electronic signal from the bus 10 through the wave displaying unit 20, and decodes the electronic signal to get the identification of the electronic signal.

In block S104, the decode unit 34 determines if the electronic signal is valid through comparing the decoded identification of the electronic signal with the identification of the electronic signal inputted by the user. If the decoded identification of the electronic signal and the identification of the electronic signal inputted by the user are the same, the electronic signal is valid and the procedure continues to block S105. If the decoded identification of the electronic signal and the identification of the electronic signal inputted by the user is different from each other, the electronic signal is invalid and the procedure returns to block S101.

In block S105, the testing unit 36 samples a parameter of the electronic signal from the bus 10, such as voltage values of the electronic signal at different times. The testing unit 36 calculates the maximum and minimum voltage values. The wave displaying unit 20 moves a first cursor and a second cursor to the positions of the maximum and minimum voltage values on the wave displaying unit 20 respectively.

In block S106, the testing unit 36 adjusts positions of the first and second cursors among the maximum and minimum voltage values to get the best position and definition of the electronic signal on the wave displaying unit 20.

In block S107, after getting the best position and definition of the electronic signal on the wave displaying unit 20, one or more instructions are inputted into the testing unit 36 through the operation interface in the computer 40. The testing unit 36 can automatically test the electronic signal displaying on the wave displaying unit 20. For example, when the testing unit 36 receives an instruction for testing the raising time of the electronic signal, the testing unit 36 moves the first and second cursors to the positions of the starting point and the first peak point of the signal. The testing unit 36 calculates a time difference between the starting point and the first peak point. The time difference as the raising time of the electronic signal is stored in the testing unit 36. In one exemplary embodiment, the one or more instructions may be inputted by a user.

In block S108, the testing unit 36 determines if testing processes for all electronic signals from the bus 10 are finished. If testing processes for all electronic signals from the bus 10 are finished, the procedure continues to block S109. Otherwise, the procedure returns to block S101.

In block S109, the testing unit 36 transmits testing results for all electronic signals from the bus 10 to the output unit 38.

In block S110, the output unit 38 outputs the testing results for all electronic signals from the bus 10. In one embodiment, the output unit 38 lists all testing results in a Microsoft Excel table for the user analysis although the scope of the disclosure may be applied to other spreadsheet programs or database programs. It is understood that a plurality of the wave display units 20 can be used for synchronously testing a plurality of buses.

The foregoing description of the certain inventive embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skill in the art to which the present disclosure pertains without departing from its spirit and scope. Accordingly, the scope of the present disclosure is defined by the appended claims rather than the foregoing description and the embodiments described therein.

What is claimed is:

1. A computer-implemented method for testing bus parameters, the method comprising:
    receiving an electronic signal from a bus to be tested through a wave displaying unit;
    transmitting the electronic signal to a decode unit;
    decoding the electronic signal to retrieve an identification of the electronic signal through the decode unit;
    determining if the identification of the electronic signal corresponds to a bus identification;
    testing parameters of the electronic signal passing through the bus according to an instruction input to the testing unit, and transmitting test results of the parameters to an output unit upon the condition that the identification of the electronic signal corresponds to the bus identification;
    displaying the test results of the parameters through the output unit; and
    returning to the receiving step upon the condition that the identification of the electronic signal not corresponds to the bus identification.

2. The method of claim 1, wherein connecting the bus and the wave displaying unit through one or more electronic signal channels, and each channel transmits one electronic signal.

3. The method of claim 2, wherein a channel selection unit connected to the wave displaying unit configured for controlling the electronic signal channels.

4. The method of claim 3, wherein the control module is located in a general purpose computer, and the channel selection unit, the decode unit and the testing unit are operated by an operation interface in the general purpose computer.

5. The method of claim 3, wherein the output unit is a display of the general purpose computer and displays the testing results of the parameters through a spreadsheet application.

6. The method of claim 1, wherein the wave displaying unit is an oscillograph.

7. A computer-implemented method for testing bus parameters, the method comprising:
    receiving an electronic signal from a bus to be tested through a wave displaying unit;
    transmitting the electronic signal to a decode unit;
    decoding the electronic signal to retrieve an identification of the electronic signal through the decode unit;
    determining if the identification of the electronic signal corresponds to a bus identification;
    sampling the parameters of the electronic signal to obtain a maximum value and a minimum value upon the condition that the identification of the electronic signal corresponds to the bus identification;
    moving a first cursor and a second cursor of the wave displaying unit to the positions corresponding to the maximum value and the minimum value; and
    adjusting positions of the first and second cursors among the maximum value and the minimum value to adjust the position and the definition of the electronic signal displayed through the wave displaying unit;
    testing parameters of the electronic signal passing through the bus according to an instruction input to the testing unit, and transmitting test results of the parameters to an output unit upon the condition that the identification of the electronic signal corresponds to the bus identification; and
    displaying the test results of the parameters through the output unit.

8. The method of claim 7, wherein connecting the bus and the wave displaying unit through one or more electronic signal channels, and each channel transmits one electronic signal.

9. The method of claim 8, wherein a channel selection unit connected to the wave displaying unit configured for controlling the electronic signal channels.

10. The method of claim 9, wherein the control module is located in a general purpose computer, and the channel selection unit, the decode unit and the testing unit are operated by an operation interface in the general purpose computer.

11. The method of claim 9, wherein the output unit is a display of the general purpose computer and displays the testing results of the parameters through a spreadsheet application.

12. The method of claim 7, wherein the wave displaying unit is an oscillograph.

* * * * *